United States Patent
Cooper et al.

(10) Patent No.: US 10,764,265 B2
(45) Date of Patent: Sep. 1, 2020

(54) ASSIGNING A DOCUMENT TO PARTIAL MEMBERSHIP IN COMMUNITIES

(71) Applicant: ENT. SERVICES DEVELOPMENT CORPORATION LP, Houston, TX (US)

(72) Inventors: James C. Cooper, Bloomington, IN (US); Kas Kasravi, West Bloomfield, MI (US); Michelle Holmes, Palo Alto, CA (US); Helen Balinsky, Bristol (GB)

(73) Assignee: ENT. SERVICES DEVELOPMENT CORPORATION LP, Houston, TX (US)

( * ) Notice: Subject to any disclaimer, the term of this patent is extended or adjusted under 35 U.S.C. 154(b) by 0 days.

(21) Appl. No.: 15/306,708

(22) PCT Filed: Sep. 24, 2014

(86) PCT No.: PCT/US2014/057148
§ 371 (c)(1),
(2) Date: Oct. 25, 2016

(87) PCT Pub. No.: WO2016/048295
PCT Pub. Date: Mar. 31, 2016

(65) Prior Publication Data
US 2017/0195304 A1    Jul. 6, 2017

(51) Int. Cl.
*H04L 29/06* (2006.01)
*G06F 16/22* (2019.01)
*G06F 40/205* (2020.01)
*G06N 5/04* (2006.01)

(52) U.S. Cl.
CPC .......... *H04L 63/08* (2013.01); *G06F 16/22* (2019.01); *G06F 40/205* (2020.01); *G06N 5/04* (2013.01); *H04L 63/102* (2013.01)

(58) Field of Classification Search
CPC ... H04L 63/08; H04L 63/102; G06F 17/2705; G06F 17/30312; G06N 5/04
See application file for complete search history.

(56) References Cited

U.S. PATENT DOCUMENTS 5,159,667 A * 10/1992 Borrey ............... G06K 9/00442
715/205
5,937,084 A    8/1999 Crabtree et al.
(Continued)

FOREIGN PATENT DOCUMENTS

WO    WO-2001014992    3/2001

OTHER PUBLICATIONS

Dibya Bora et al., A Comparative study Between Fuzzy Clustering Algorithm and Hard Clustering Algorithm, IJCTT, Apr. 2014.*
(Continued)

*Primary Examiner* — David Garcia Cervetti
(74) *Attorney, Agent, or Firm* — Sheppard Mullin Richter & Hampton LLP (57) ABSTRACT

Example implementations relate to assigning a document to partial membership in communities. In example implementations, a detected feature of a document may be compared with a training pattern. Based on the comparison, the document may be assigned partial membership in a first community and partial membership in a second community.

20 Claims, 6 Drawing Sheets

(56) References Cited

U.S. PATENT DOCUMENTS

| | | | | |
|---|---|---|---|---|
| 6,112,181 | A * | 8/2000 | Shear | G06F 21/10 705/7.29 |
| 6,483,808 | B1 * | 11/2002 | Rochberger | H04L 12/5601 370/238 |
| 7,185,236 | B1 * | 2/2007 | Moser | G06F 11/2028 709/209 |
| 8,285,719 | B1 * | 10/2012 | Long | G06N 7/005 707/737 |
| 8,630,975 | B1 * | 1/2014 | Guo | G06N 7/005 707/608 |
| 8,671,112 | B2 * | 3/2014 | Amar | G06F 16/353 707/780 |
| 8,719,444 | B2 | 5/2014 | Chou et al. | |
| 8,775,441 | B2 * | 7/2014 | Anderson | G06F 16/90344 707/749 |
| 8,844,003 | B1 * | 9/2014 | Jakobsson | G06F 21/552 726/5 |
| 9,037,589 | B2 * | 5/2015 | Anderson | G06F 16/278 707/737 |
| 9,069,444 | B1 * | 6/2015 | Hansen | G06F 16/178 |
| 9,147,273 | B1 * | 9/2015 | Allen | G06T 11/206 |
| 9,231,979 | B2 * | 1/2016 | Duke | H04L 63/20 |
| 9,280,683 | B1 * | 3/2016 | Echeverria | G06F 16/134 |
| 9,325,791 | B1 * | 4/2016 | Blahaerath | H04L 67/1097 |
| 9,454,537 | B2 * | 9/2016 | Prahlad | G06F 3/0649 |
| 9,607,103 | B2 * | 3/2017 | Anderson | G06N 20/00 |
| 9,678,981 | B1 * | 6/2017 | Taylor | G06F 16/122 |
| 9,703,658 | B2 * | 7/2017 | Schuermyer | G06F 11/26 |
| 9,824,095 | B1 * | 11/2017 | Taylor | G06F 11/1451 |
| 9,830,467 | B1 * | 11/2017 | Harold | G06F 21/6218 |
| 9,876,637 | B2 * | 1/2018 | Gauda | G06F 21/6218 |
| 9,916,538 | B2 * | 3/2018 | Zadeh | G06N 7/005 |
| 10,091,290 | B1 * | 10/2018 | Hansen | H04L 67/1095 |
| 2001/0044766 | A1 * | 11/2001 | Keyes | G06Q 40/00 705/36 R |
| 2002/0010772 | A1 * | 1/2002 | Kusano | H04L 47/2433 709/223 |
| 2003/0046244 | A1 * | 3/2003 | Shear | G06F 16/285 705/52 |
| 2003/0097403 | A1 * | 5/2003 | Bhatia | H04L 47/14 709/203 |
| 2004/0215606 | A1 * | 10/2004 | Cossock | G06F 16/337 |
| 2005/0039051 | A1 * | 2/2005 | Erofeev | H04L 63/029 726/4 |
| 2005/0069207 | A1 * | 3/2005 | Zakrzewski | G06K 9/629 382/190 |
| 2005/0086430 | A1 * | 4/2005 | Allen | G06F 3/0685 711/114 |
| 2005/0149459 | A1 * | 7/2005 | Kofman | G06N 7/026 706/2 |
| 2005/0246510 | A1 * | 11/2005 | Retnamma | G06F 11/1464 711/162 |
| 2005/0257062 | A1 * | 11/2005 | Ignatius | H04L 9/0894 713/176 |
| 2005/0278143 | A1 * | 12/2005 | Wegerich | G05B 17/02 702/182 |
| 2007/0143756 | A1 * | 6/2007 | Gokhale | G06F 11/1461 718/100 |
| 2007/0162359 | A1 * | 7/2007 | Gokhale | G06Q 10/08 705/28 |
| 2007/0179995 | A1 * | 8/2007 | Prahlad | G06F 11/1464 |
| 2007/0185852 | A1 * | 8/2007 | Erofeev | G06F 16/16 |
| 2007/0185926 | A1 * | 8/2007 | Prahlad | G06F 16/1734 |
| 2007/0185937 | A1 * | 8/2007 | Prahlad | G06F 16/184 |
| 2007/0185938 | A1 * | 8/2007 | Prahlad | G06F 16/184 |
| 2007/0185939 | A1 * | 8/2007 | Prahland | G06F 16/184 |
| 2007/0186068 | A1 * | 8/2007 | Agrawal | G06F 11/1456 711/162 |
| 2008/0059704 | A1 * | 3/2008 | Kavuri | G06F 11/3495 711/117 |
| 2008/0147754 | A1 * | 6/2008 | Littlefield | G06F 11/20 |
| 2009/0024702 | A1 * | 1/2009 | Schweier | H04L 67/02 709/203 |
| 2009/0132662 | A1 * | 5/2009 | Sheridan | H04L 51/26 709/206 |
| 2009/0319534 | A1 * | 12/2009 | Gokhale | G06F 16/178 |
| 2010/0005151 | A1 * | 1/2010 | Gokhale | G06F 16/27 709/216 |
| 2010/0017354 | A1 * | 1/2010 | Chan | G06K 9/6253 706/47 |
| 2010/0082642 | A1 * | 4/2010 | Forman | G06F 16/35 707/749 |
| 2010/0106724 | A1 * | 4/2010 | Anderson | G06F 16/24544 707/737 |
| 2010/0145909 | A1 * | 6/2010 | Ngo | G06F 11/2094 707/611 |
| 2010/0179941 | A1 * | 7/2010 | Agrawal | G06F 11/1451 707/624 |
| 2010/0272357 | A1 * | 10/2010 | Maxwell | G06K 9/34 382/173 |
| 2010/0274573 | A1 * | 10/2010 | Feied | G06Q 50/22 705/2 |
| 2010/0280998 | A1 * | 11/2010 | Goebel | G06F 3/0619 707/652 |
| 2010/0325131 | A1 * | 12/2010 | Dumais | G06F 16/9535 707/759 |
| 2010/0325422 | A1 * | 12/2010 | Gnanasambandam | G06F 16/122 713/153 |
| 2010/0332401 | A1 * | 12/2010 | Prahlad | H04L 67/1097 705/80 |
| 2011/0016091 | A1 * | 1/2011 | Prahlad | G06F 16/162 707/654 |
| 2011/0022642 | A1 * | 1/2011 | deMilo | G06F 21/602 707/805 |
| 2011/0040980 | A1 * | 2/2011 | Kerr | G06F 21/6245 713/189 |
| 2011/0071969 | A1 * | 3/2011 | Doctor | G06N 3/0436 706/15 |
| 2011/0078145 | A1 * | 3/2011 | Chung | G06F 16/313 707/737 |
| 2011/0106772 | A1 * | 5/2011 | Kawamura | G06K 9/6254 707/687 |
| 2011/0270834 | A1 * | 11/2011 | Sokolan | G06F 40/20 707/737 |
| 2011/0289310 | A1 | 11/2011 | Selgas et al. | |
| 2011/0296520 | A1 * | 12/2011 | Erofeev | H04L 63/0209 726/14 |
| 2012/0109723 | A1 * | 5/2012 | Crooks | G06Q 40/025 705/14.1 |
| 2012/0143865 | A1 * | 6/2012 | Dubberley | G06F 16/2468 707/737 |
| 2012/0143868 | A1 | 6/2012 | Summerlin et al. | |
| 2012/0191715 | A1 * | 7/2012 | Ruffner | G06F 16/93 707/738 |
| 2012/0222132 | A1 * | 8/2012 | Burger | G06F 21/604 726/28 |
| 2012/0303665 | A1 * | 11/2012 | Engelko | G06F 16/2379 707/780 |
| 2012/0303736 | A1 * | 11/2012 | Novotny | H04L 67/1008 709/213 |
| 2012/0323976 | A1 | 12/2012 | Stidworthy et al. | |
| 2013/0017968 | A1 * | 1/2013 | Gurtner | C12Q 1/6876 506/9 |
| 2013/0036100 | A1 * | 2/2013 | Nagpal | G06F 16/1748 707/692 |
| 2013/0088712 | A1 * | 4/2013 | Holl | G07G 1/0081 356/213 |
| 2013/0110779 | A1 * | 5/2013 | Taylor | G06F 16/1844 707/624 |
| 2013/0110967 | A1 * | 5/2013 | Ueoka | G06F 16/185 709/214 |
| 2013/0117240 | A1 * | 5/2013 | Taylor | G06F 16/182 707/690 |
| 2013/0138619 | A1 * | 5/2013 | Krislov | G06F 21/6209 707/695 |
| 2013/0191339 | A1 | 7/2013 | Haden et al. | |
| 2013/0219176 | A1 * | 8/2013 | Akella | G06F 16/185 713/165 |

(56) References Cited

U.S. PATENT DOCUMENTS

| | | | | |
|---|---|---|---|---|
| 2013/0305039 A1* | 11/2013 | Gauda | H04L 9/0816 | 713/153 |
| 2013/0346408 A1* | 12/2013 | Duarte | G06F 16/285 | 707/737 |
| 2013/0346962 A1 | 12/2013 | Fang et al. | | |
| 2014/0006350 A1* | 1/2014 | Fukui | G06F 16/178 | 707/632 |
| 2014/0006354 A1* | 1/2014 | Parkison | G06F 3/067 | 707/649 |
| 2014/0006357 A1* | 1/2014 | Davis | G06F 16/182 | 707/667 |
| 2014/0006465 A1* | 1/2014 | Davis | G06F 16/183 | 707/827 |
| 2014/0007239 A1* | 1/2014 | Sharpe | G06F 16/137 | 726/24 |
| 2014/0079297 A1* | 3/2014 | Tadayon | G06K 9/00288 | 382/118 |
| 2014/0081932 A1* | 3/2014 | Krislov | G06F 21/6209 | 707/694 |
| 2014/0149461 A1 | 5/2014 | Wijayaratne et al. | | |
| 2014/0180981 A1* | 6/2014 | Dolev | G06K 9/00442 | 706/12 |
| 2014/0181033 A1* | 6/2014 | Pawar | G06F 16/21 | 707/644 |
| 2014/0201126 A1* | 7/2014 | Zadeh | A61B 5/165 | 706/52 |
| 2014/0230011 A1* | 8/2014 | Drewry | H04L 63/0435 | 726/1 |
| 2014/0250491 A1* | 9/2014 | Fleischman | G06F 12/1408 | 726/1 |
| 2014/0258350 A1* | 9/2014 | Duval | G06F 16/176 | 707/829 |
| 2014/0324945 A1* | 10/2014 | Novak | G06F 3/0604 | 709/203 |
| 2014/0344456 A1* | 11/2014 | Buzbee | H04L 29/08081 | 709/225 |
| 2014/0365537 A1* | 12/2014 | Zhao | G06F 3/0632 | 707/812 |
| 2015/0006957 A1* | 1/2015 | Ginzinger | G06F 3/067 | 714/15 |
| 2015/0089608 A1* | 3/2015 | Nandyala | H04L 63/20 | 726/6 |
| 2015/0105049 A1* | 4/2015 | Golaup | H04L 63/0892 | 455/411 |
| 2015/0154418 A1* | 6/2015 | Redberg | G06F 21/6218 | 713/165 |
| 2015/0186668 A1* | 7/2015 | Whaley | G06F 16/178 | 713/156 |
| 2015/0227749 A1* | 8/2015 | Schincariol | H04L 67/1097 | 726/28 |
| 2015/0310188 A1* | 10/2015 | Ford | H04L 63/0428 | 726/28 |
| 2015/0334458 A1* | 11/2015 | Srinivasan | H04N 21/4667 | 725/14 |
| 2015/0365385 A1* | 12/2015 | Hore | H04L 63/06 | 713/152 |
| 2015/0373109 A1* | 12/2015 | Cox | H04L 67/1097 | 709/224 |
| 2016/0021186 A1* | 1/2016 | de Sene | H04L 47/821 | 709/213 |
| 2016/0078247 A1* | 3/2016 | Tucker | G06F 21/57 | 726/1 |
| 2016/0127337 A1* | 5/2016 | Fleischman | H04L 63/0428 | 713/193 |
| 2017/0161326 A1* | 6/2017 | Anderson | G06F 16/285 | |
| 2018/0082076 A1* | 3/2018 | Murray | G06F 21/602 | |
| 2019/0013936 A1* | 1/2019 | Murray | H04L 63/20 | |

OTHER PUBLICATIONS

Bing Liu et al., Partially Supervised Classification of Text Documents, ICML-02, 2002.*

Weiliang Qiu et al., Separation index and partial membership for clustering, Elsevier, Oct. 2004.*

Willem Waegeman et al., Supervised learning algorithms for multi-class classification problems with partial class memberships, ScienceDirect, Dec. 2010.*

Yang et al., DAC-MACS: Effective Data Access Control for Multiauthority Cloud Storage Systems, IEEE, Nov. 2013.*

Kaushik et al., Lightning: Self-Adaptive, Energy-Conserving, Multi-Zoned, Commodity Green Cloud Storage System, ACM, 2010.*

Tang et al., FADE: Secure Overlay Cloud Storage with File Assured Deletion, LNICST, 2010.*

Caroline; "Tools: SpiderOak" Nov. 14, 2012; 3 pages http://researchdata.wisc.edu/author/caroline/.

PCT; "Notification of Transmittal of the International Search Report and the Written Opinion of the International Searching Authority, or the Declaration"; cited in PCT/US2014/057148; dated Jun. 1, 2015; 15 pages.

* cited by examiner

ASSIGNING A DOCUMENT TO PARTIAL MEMBERSHIP IN COMMUNITIES

CLAIM FOR PRIORITY

The present application is a national stage filing under 35 U.S.C. § 371 of PCT application number PCT/US2014/057148, having an international filing date of Sep. 24, 2014, the disclosure of which is hereby incorporated by reference in its entirety.

BACKGROUND

Files may be stored in local hard drives or in remote drives available through a cloud service. When storing files, a user may select between many different storage locations, some local and some available through cloud service providers. Stored files may be classified to improve search results.

BRIEF DESCRIPTION OF THE DRAWINGS

The following detailed description references the drawings, wherein.

DETAILED DESCRIPTION

Electronic user devices may be used for professional as well as personal purposes, leading to corporate data and personal data existing on the same device. For example, an employee who works for a company with a bring your own device (BYOD) policy may use his/her smartphone to respond to work-related e-mails as well as personal e-mails. In addition, a user may use the same device to conduct business for multiple companies (e.g., if the user has multiple part-time jobs, or is a consultant who works for different clients/companies through a single firm). A user may store personal documents and work-related documents in various locations. Some storage locations may be dictated by corporate/group guidelines or rules; for example, a company policy may dictate that all company confidential documents be stored in a company private cloud, or that documents having certain characteristics/patterns not be stored in a particular location. Guidelines/Rules regarding storage locations for documents may be based on regulation compliance, data handling policies, backup requirements, data sensitivity, etc. As used herein, the term "document" should be understood to refer to any form of media that may be used to convey information. Documents may include textual information (e.g., articles, blog posts/comments, research papers, business/financial/medical records or reports), videos, photographs, audio information (e.g., voicemails, podcasts, music recordings), e-mail messages, social media activity, or any combination of the above and/or other suitable documents.

As the number of documents that a user accesses and the number of contexts in which the user accesses documents increase, a desired document may become more difficult to find. In addition, inadequate security measures in certain storage locations may lead to unauthorized access of documents. In light of the above, the present disclosure provides for classifying documents according to various characteristics and facilitating storage of documents in recommended/policy-dictated locations.

Figure 1:
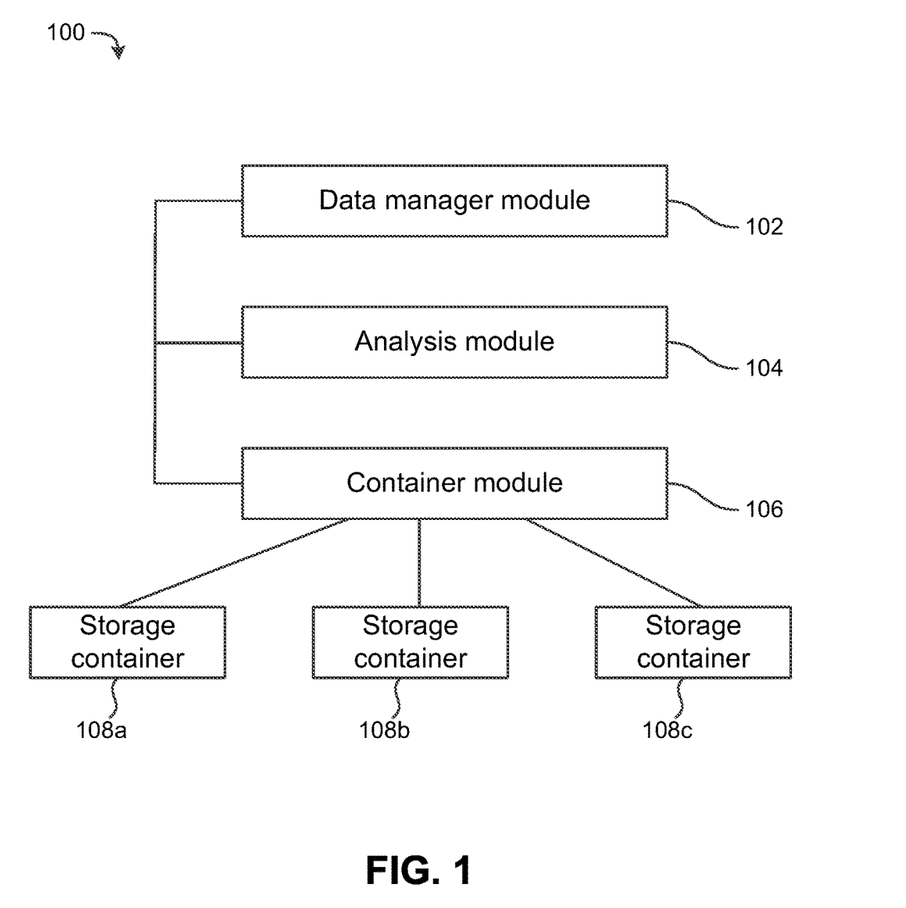
FIG. 1 is a block diagram of an example system for assigning documents to partial membership in communities.

Referring now to the drawings, FIG. 1 is a block diagram of an example system 100 for assigning documents to partial membership in communities. In FIG. 1, system 100 may include modules 102, 104, and 106. As used herein, the terms "include", "have", and "comprise" are interchangeable and should be understood to have the same meaning. A module may include a set of instructions encoded on a machine-readable storage medium and executable by a processor. In addition or as an alternative, a module may include a hardware device comprising electronic circuitry for implementing the functionality described below.

Data manager module 102 may store a plurality of training patterns and preferred storage container data. As used herein, the term "storage container" should be understood to refer to any suitable storage device or service. Examples of storage containers may include, for example, hard disk drives (HDDs), solid-state drives (SSDs), virtual disks, cloud storage services, or file sharing and synchronization (FSS) services (e.g., Box, Google Drive). As used herein, the term "preferred storage container data" should be understood to refer to data indicative of a storage container in which documents associated with a community should be stored and/or are most commonly stored. As used herein, the term "community" should be understood to refer to an entity with which a document may be associated. A community may be, for example, a company, an organization, a committee, a school, a person, a family, a geographical area or location, or a project. Each community may have its own preferred storage container, authentication methodology, and security policies.

In some implementations, data manager module 102 may receive training patterns and/or preferred storage container data from data managers or administrators associated with various communities. For example, a data manager associated with Organization X may transmit classifier- and/or keywords-based policies to data manager module 102 that may be used to identify documents to which Organization X has legal claim. Committee Y may want its members to use Dropbox to store committee-related files (e.g., for committee accountability), and an administrator associated with Committee Y may transmit, to data manager module 102, preferred storage container data specifying Dropbox as Committee Y's preferred storage container.

The more strongly a document is associated with and/or relevant to a community, the higher the document's degree of membership in the community may be. A document's degree of membership in a community may be quantified along a sliding scale with a minimum value and a maximum value (e.g., as a percentage between 0% and 100%). A document whose degree of membership in a community is quantified as the maximum value of a sliding scale may be referred to as having "full membership" in, or being a "full member" of, the community. A full member of a community may be very strongly and/or exclusively associated with the community. A document whose degree of membership in a community is quantified as the minimum value of a sliding scale may be referred to as having "no membership" in, or "not a member" of, the community. A document that is not a member of a community may not be associated with the community at all. A document whose degree of membership in a community is quantified as a value between the minimum value and the maximum value of a sliding scale may be referred to as having "partial membership" in, or being a "partial member" of, the community.

A document may have partial and/or full membership in more than one community. For example, a document authored by members of three different project groups may have 20% membership in the first project group, 35% membership in the second project group, and 45% membership in the third project group. In implementations where degree of membership is quantified as a percentage between 0% and 100%, the respective percentages quantifying a document's degree of membership in various communities may add up to less than 100%, to 100% exactly, or to more than 100% (e.g., degree of membership in one community may be quantified independently of degree of membership in another community; e.g., it is possible for a document to have 100% membership in each of four different communities). For example, a service request form used by some employees of Company A as well as by some employees of Company B may have 75% membership in Company A and 50% membership in Company B. Percentages of membership in various communities may be used to determine relevance of documents to search criteria.

Analysis module 104 may assign, based on one of the plurality of training patterns stored using data manager module 102, a document to partial membership in a first community and partial membership in a second community. A training pattern may be used with various supervised machine learning techniques. In some implementations, analysis module 104 may use a training pattern to train an artificial neural network ("neural net"), support vector machine (SVM), or Bayesian belief network (BBN) to recognize documents associated with the first and/or second community. For example, the document may include contact information for various vendors that a corporation uses, and a neural net may have been trained using a training pattern to recognize information related to vendors that a first business unit within the corporation uses, and information related to vendors that a second business unit within the corporation uses. Some vendors listed in the document may be used by the first and/or second business unit, and thus analysis module 104 may assign the document to partial membership in the first business unit and partial membership in the second business unit. The degree of membership in each business unit may depend, for example, on how many of the listed vendors the respective business unit uses. In some implementations, analysis module 104 may use a first training pattern to train a neural net/SVM/BBN to recognize documents associated with a first community (e.g., the first business unit), and use a second training pattern to train the neural net/SVM/BBN to recognize documents associated with a second community (e.g., the second business unit). It should be understood that the concepts discussed herein related to determining/quantifying partial membership in two communities may apply to determining/quantifying partial membership in any number of communities.

In some implementations, analysis module 104 may detect features of a document. Features may include, for example, metadata and keywords. Analysis module 104 may use, for example, term frequency-inverse document frequency (tf-idf) and/or feature extraction and change detection techniques (e.g., described in U.S. Pat. No. 8,375,022) to detect features of the document. Analysis module 104 may compare detected features with one of the plurality of training patterns stored using data manager module 102, and use fuzzy logic to compute percentages of membership in a first community and in a second community. For example, a document may include various product specifications that multiple product teams in a company are working to meet, and analysis module 104 may use a training pattern to recognize certain product-related keywords in the document and use fuzzy logic to quantify the relevance of such keywords to respective product teams.

In some implementations, analysis module 104 may select between partial membership of a document in two different communities. For example, training patterns may be used to identify the country of France, Corporation ABC, and Corporation XYZ as possible communities in which a document may be assigned membership, and the document may include sensitive financial information that should be accessible to either Corporation ABC or Corporation XYZ, but not both. In some implementations, analysis module 104 may use centroid defuzzification to select which of Corporation ABC and Corporation XYZ to assign partial membership of the document, and may also assign partial membership of the document to the France community (e.g., because some of the financial information in the document is related to business done in France) regardless of which corporation is selected.

In some implementations, a rigid keyword-based policy may be applied in a conclusive manner to select between membership of a document in two different communities. For example, if analysis module 104 detects the phrase "Corporation ABC Confidential" in a document, the document may be assigned full or partial membership in the Corporation ABC community and may have no membership in any other corporate community, regardless of whether other keywords are detected in the document that indicate relevance to other corporations. The document may also be assigned partial/full membership in non-corporate communities, such as geographical or project communities, and percentages quantifying degree of membership may be computed accordingly.

In some implementations, analysis module 104 may identify a cluster of documents as a new community. For example, a data manager module 102 may define a new community in response to receiving new training patterns and/or preferred storage container data, and analysis module 104 may identify documents that should be assigned full or partial membership in the new community. In some implementations, analysis module 104 may define a new community for documents having similar defuzzification scores. A new community may be labeled by a system administrator, or may be automatically labeled by data manager module 102 or analysis module 104.

In some examples, analysis module 104 may be implemented as a client on a user device. A user device may include, for example, a notebook computer, a desktop computer, a workstation, a tablet computing device, a mobile phone, or an electronic book reader. In some examples, analysis module 104 may reside on a remote server. In some examples, functionality of analysis module 104 may be split between a client (e.g., on a user device) and a server.

Container module 106 may be communicatively coupled to storage containers 108a, 108b, and 108c. Container module 106 may provide a unified interface for accessing storage containers 108a-c. Container module 106 may transmit a document to one of storage containers 108a-c. For example, when an employee of a company saves a document, container module 106 may determine, based on preferred storage container data stored using data manager module 102, which of storage containers 108a-c is the company's preferred storage container, and may transmit the document to the company's preferred storage container. Although three storage containers are shown in FIG. 1, it should be understood that system 100 may include additional storage containers or fewer storage containers, and that the concepts discussed herein may apply to systems with any number of storage containers.

Figure 2:
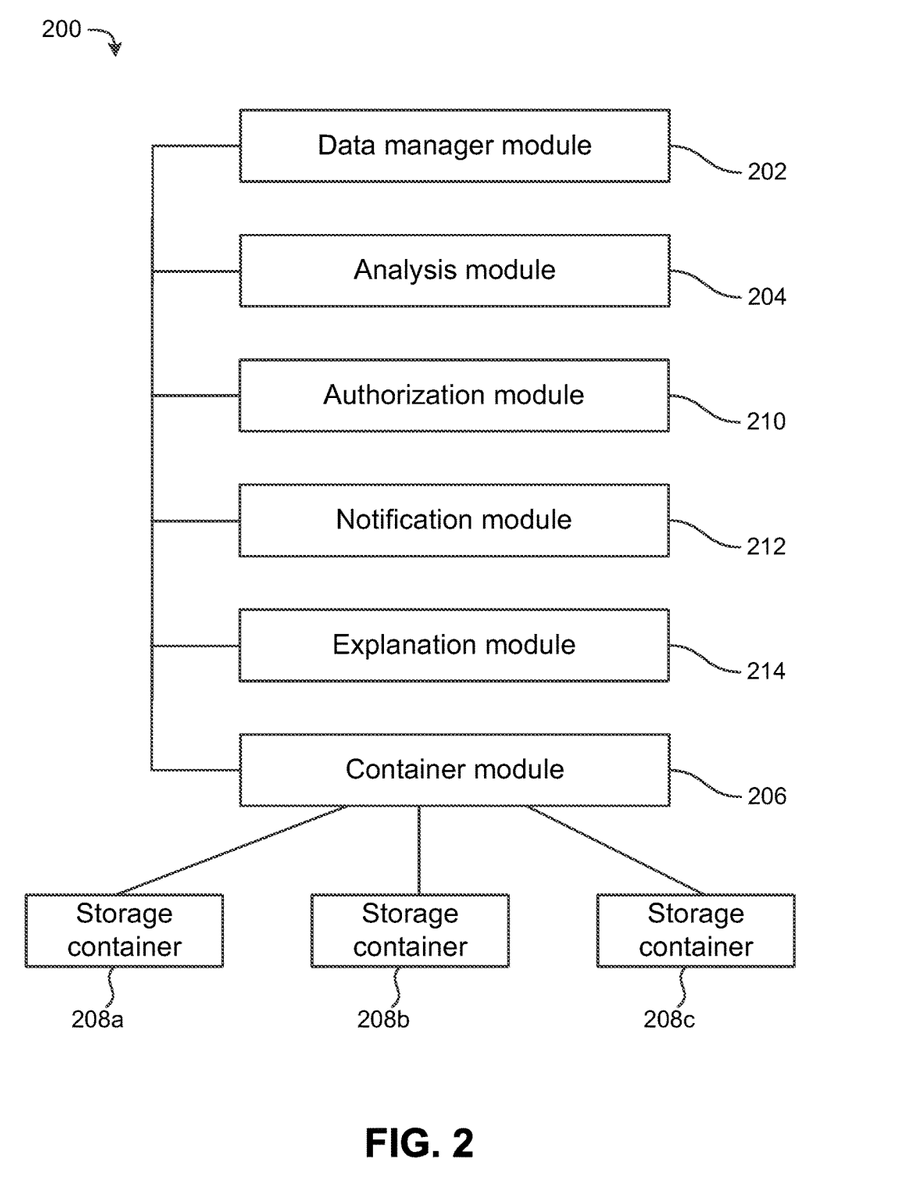
FIG. 2 is a block diagram of an example system for generating notifications regarding document storage.

FIG. 2 is a block diagram of an example system 200 for generating notifications regarding document storage. In FIG. 2, system 200 may include modules 202, 204, 206, 210, and 212. Modules 202, 204, and 206 of FIG. 2 may be analogous to (e.g., have functions and/or components similar to) modules 102, 104, and 106, respectively, of FIG. 1. A module may include a set of instructions encoded on a machine-readable storage medium and executable by a processor. In addition or as an alternative, a module may include a hardware device comprising electronic circuitry for implementing the functionality described below.

Authorization module 210 may generate authorization data based on preferred storage container data. For example, if Company X has a policy that its employees should use a private cloud storage service to store company-related documents, and has transmitted preferred storage container data accordingly to data manager module 202, authorization module 210 may generate authorization data indicating that employees of Company X are authorized to access the private cloud storage service. In some implementations, authorization data may include authentication credentials, such as login names, passwords, e-mail addresses associated with active accounts, and/or digital certificates. In some implementations, providers of storage containers may manage authorization data, for example by updating lists of subscribers to an FSS service.

In some implementations, analysis module 204 may use authentication credentials to identify a community associated with a document. Continuing with the Company X example, an employee of Company X may create a document while logged in to his/her company e-mail account, and analysis module 204 may recognize the employee's e-mail address as being associated with the Company X community. Analysis module 204 may assign the document to have partial or full membership in the Company X community.

Container module 206 may determine, based on authorization data, whether a user is authorized to access one of storage containers 208a, 208b, and 208c, which may be analogous to storage containers 108a, 108b, and 108c of FIG. 1. Continuing with the Company X example, if the private cloud storage service is storage container 208a, container module 206 may recognize a Company X employee's e-mail address as a registered subscriber to the private cloud storage service, and may authorize the employee to access storage container 208a (e.g., save documents to and retrieve documents from storage container 208a) but not storage containers 208b-c. In some implementations, an employee may be signed into different accounts on the same device; for each account, different types of documents and/or storage containers may be accessed. Although three storage containers are shown in FIG. 2, it should be understood that system 200 may include additional storage containers or fewer storage containers, and that the concepts discussed herein may apply to systems with any number of storage containers.

In some implementations, analysis module 204 may determine, based on preferred storage container data stored in data manager module 202, whether a selected one of storage containers 208a-c is suitable for storing a document. Continuing with the Company X example, if an employee of Company X selects a public cloud storage service (e.g., storage container 208b) to store a document, analysis module 204 may retrieve preferred storage container data associated with Company X and determine that the selected public cloud storage service is not Company X's preferred storage container, and thus that the selected public cloud storage service is not suitable for storing the document.

In some implementations, preferred storage container data may include criteria for storage containers used to store documents, rather than specifying a particular storage container, and analysis module 204 may determine whether a selected storage container meets the criteria. For example, a company's preferred storage container data may stipulate that a cloud-based storage service should be used to store the company's documents; thus, if an employee of the company selects a local HDD to store a document, analysis module 204 may determine that the selected HDD is not a cloud-based storage service and thus is not suitable for storing the document. However, if the employee selects a private cloud storage service or a public cloud storage service, analysis module 204 may determine that the selected storage service is suitable for storing the document.

Notification module 212 may generate a notification in response to a determination that a selected storage container is not suitable for storing a document. Continuing with the Company X example, if an employee of Company X selects a public cloud storage service (e.g., storage container 208b) to store a document, notification module 212 may generate a pop-up window that may be displayed on the employee's user device (e.g., laptop), informing the employee that the selected storage service does not conform with the company's storage policies. In some implementations, notification module 212 may generate a notification (e.g., dialog box) informing a user that he/she has selected a storage container that is non-compliant with the relevant preferred storage container data, and asking the user whether he/she wishes to proceed with using the selected (non-compliant) storage container. If the user confirms that the non-compliant storage container is to be used, notification module 212 may generate another notification (e.g., e-mail or event log entry) that may provide details of the usage of the non-compliant storage container. For example, the second notification may specify the time and date that the non-compliant storage container was used to store a document, and include data that may be used to identify the document that was stored, which non-compliant storage container was used, and the user that selected the non-compliant storage container. In a corporate setting, the second notification may be sent to a supervisor or system administrator at a company. In some implementations, responses to notifications may be used to refine training patterns.

In some implementations, system 200 may include explanation module 214. Explanation module 214 may provide an explanation of the assignment of partial memberships to first and second communities. For example, if a BBN is used to recognize documents associated with the first and second communities, explanation module 214 may provide a list of the conditional dependencies associated with a BBN node that represents the first or second community. The conditional dependencies may be indicative of features of a document that make the document relevant to the first and/or second community. In implementations where analysis module 204 selects between partial membership of a document in two different communities, explanation module 214 may provide an explanation of why the selected community was selected over the other (e.g., because a certain keyword was detected in the document, or the document was subject to a certain policy).

Figure 3:
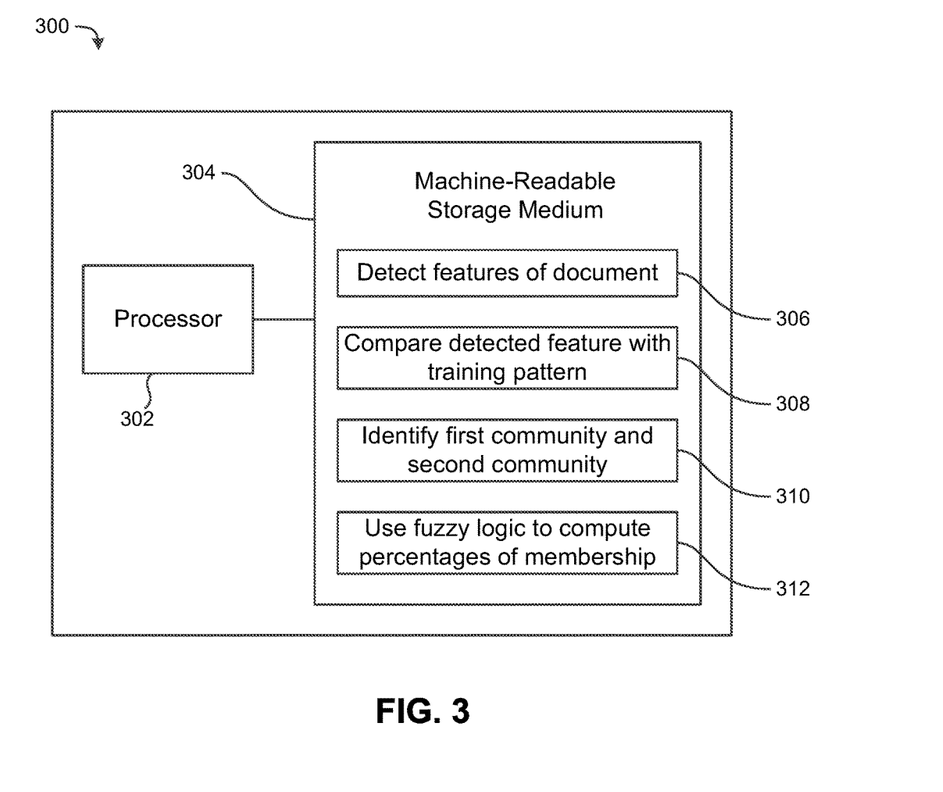
FIG. 3 is a block diagram of an example device that includes a machine-readable storage medium encoded with instructions to enable assigning a document to partial membership in multiple communities.

FIG. 3 is a block diagram of an example device 300 that includes a machine-readable storage medium encoded with instructions to enable assigning a document to partial membership in multiple communities. In some implementations, device 300 may be part of a user device. In some implementations, device 300 may be part of a server. In FIG. 3, device 300 includes processor 302 and machine-readable storage medium 304.

Processor 302 may include a central processing unit (CPU), microprocessor (e.g., semiconductor-based microprocessor), and/or other hardware device suitable for retrieval and/or execution of instructions stored in machine-readable storage medium 304. Processor 302 may fetch, decode, and/or execute instructions 306, 308, 310, and 312 to enable assigning a document to partial membership in multiple communities, as described below. As an alternative or in addition to retrieving and/or executing instructions, processor 302 may include an electronic circuit comprising a number of electronic components for performing the functionality of instructions 306, 308, 310, and/or 312.

Machine-readable storage medium 304 may be any suitable electronic, magnetic, optical, or other physical storage device that contains or stores executable instructions. Thus, machine-readable storage medium 304 may include, for example, a random-access memory (RAM), an Electrically Erasable Programmable Read-Only Memory (EEPROM), a storage device, an optical disc, and the like. In some implementations, machine-readable storage medium 304 may include a non-transitory storage medium, where the term "non-transitory" does not encompass transitory propagating signals. As described in detail below, machine-readable storage medium 304 may be encoded with a set of executable instructions 306, 308, 310, and 312.

Instructions 306 may detect features of a document. For example, instructions 306 may detect which day the document was created (e.g., by analyzing metadata of the document), and/or keywords in the document. In some implementations, tf-idf and/or feature extraction and change detection techniques may be used to detect features of the document, as discussed above with respect to FIG. 1.

Instructions 308 may compare a detected feature with a training pattern. The training pattern may be stored, for example, using a data manager module (e.g., data manager module 102 or 202). In some implementations, instructions 308 may use the training pattern to recognize confidential information (e.g., the phrase "privileged and confidential") in the document.

Instructions 310 may identify, based on the comparison of the detected feature with the training pattern, a first community and a second community to which the document is to be assigned partial membership. For example, the names of two different organizations may be detected in the document, and the document may be assigned partial membership in each of the respective communities accordingly. In some implementations, instructions 310 may identify, based on authentication credentials, one of the first community and the second community. For example, an employee of Company X may create a document while logged in to his/her company e-mail account, and instructions 310 may recognize the employee's e-mail address as being associated with the Company X community. In some implementations, an explanation may be provided (e.g., by explanation module 214) of why the first and second communities were identified.

Instructions 312 may use fuzzy logic to compute percentages of membership in the first community and in the second community. For example, certain product-related keywords may be detected in a document, and instructions 312 may use fuzzy logic to quantify the relevance (i.e., in terms of percentages) of such keywords to a first product team community and a second product team community. It should be understood that more than two communities may be identified to which a document is to be assigned partial membership, and that respective percentages of membership may be computed for such additional communities in accordance with the concepts described herein.

Figure 4:
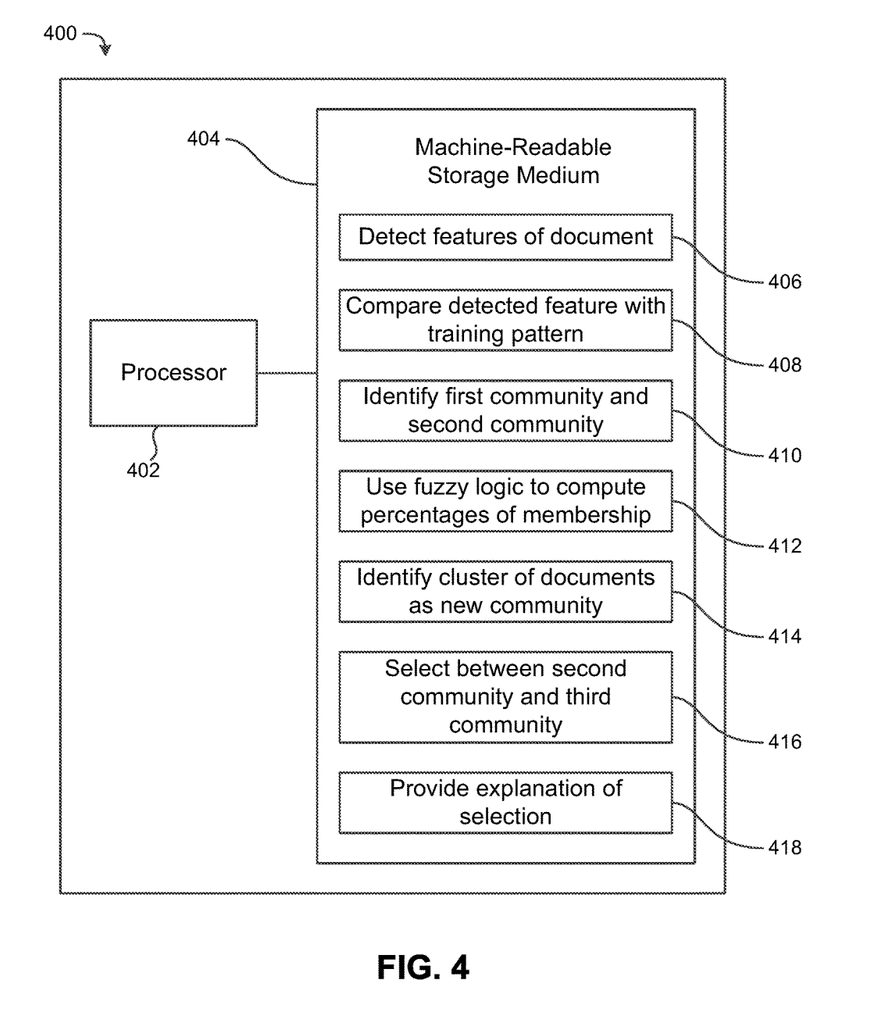
FIG. 4 is a block diagram of an example device that includes a machine-readable storage medium encoded with instructions to select between communities when identifying communities to which a document is to be assigned partial membership.

FIG. 4 is a block diagram of an example device 400 that includes a machine-readable storage medium encoded with instructions to select between communities when identifying communities to which a document is to be assigned partial membership. In some implementations, device 400 may be part of a user device. In some implementations, device 400 may be part of a server. In FIG. 4, device 400 includes processor 402 and machine-readable storage medium 404.

As with processor 302 of FIG. 3, processor 402 may include a CPU, microprocessor (e.g., semiconductor-based microprocessor), and/or other hardware device suitable for retrieval and/or execution of instructions stored in machine-readable storage medium 404. Processor 402 may fetch, decode, and/or execute instructions 406, 408, 410, 412, 414, 416, and 418. As an alternative or in addition to retrieving and/or executing instructions, processor 402 may include an electronic circuit comprising a number of electronic components for performing the functionality of instructions 406, 408, 410, 412, 414, 416, and/or 418.

As with machine-readable storage medium 304 of FIG. 3, machine-readable storage medium 404 may be any suitable physical storage device that stores executable instructions. Instructions 406, 408, 410, and 412 on machine-readable storage medium 404 may be analogous to instructions 306, 308, 310, and 312, respectively, on machine-readable storage medium 304. Instructions 414 may identify a cluster of documents as a new community. In some implementations, a data manager module (e.g., data manager module 102 or 202) may define a new community, as discussed above with respect to FIG. 1, and instructions 414 may identify documents that should be assigned full or partial membership in the new community. In some implementations, instructions 414 may define a new community for documents having similar defuzzification scores. A new community may be labeled by a system administrator, or may be automatically labeled by a data manager module.

Instructions 416 may select between two different communities when identifying communities to which a document is to be assigned partial membership. For example, a document may include sensitive financial information that should be accessible to either Corporation ABC or Corporation XYZ, but not both. Instructions 416 may select which of Corporation ABC and Corporation XYZ to assign partial membership of the document, and may also assign partial membership of the document to a non-corporate (e.g., geographical) community regardless of which corporation is selected. In some implementations, instructions 416 may use centroid defuzzification to select between two different communities (e.g., between Corporation ABC and Corporation XYZ). In some implementations, instructions 416 may use a keyword-based policy to select between two different communities, as discussed above with respect to FIG. 1.

Instructions 418 may provide an explanation of the selection of a community to which a document is to be assigned partial membership. For example, instructions 418 may provide an explanation of why instructions 416 selected Corporation ABC over Corporation XYZ (or vice-versa). Instructions 418 may be executed in implementations where a BBN is used to recognize documents associated with various communities, as discussed above with respect to FIG. 2.

Figure 5:
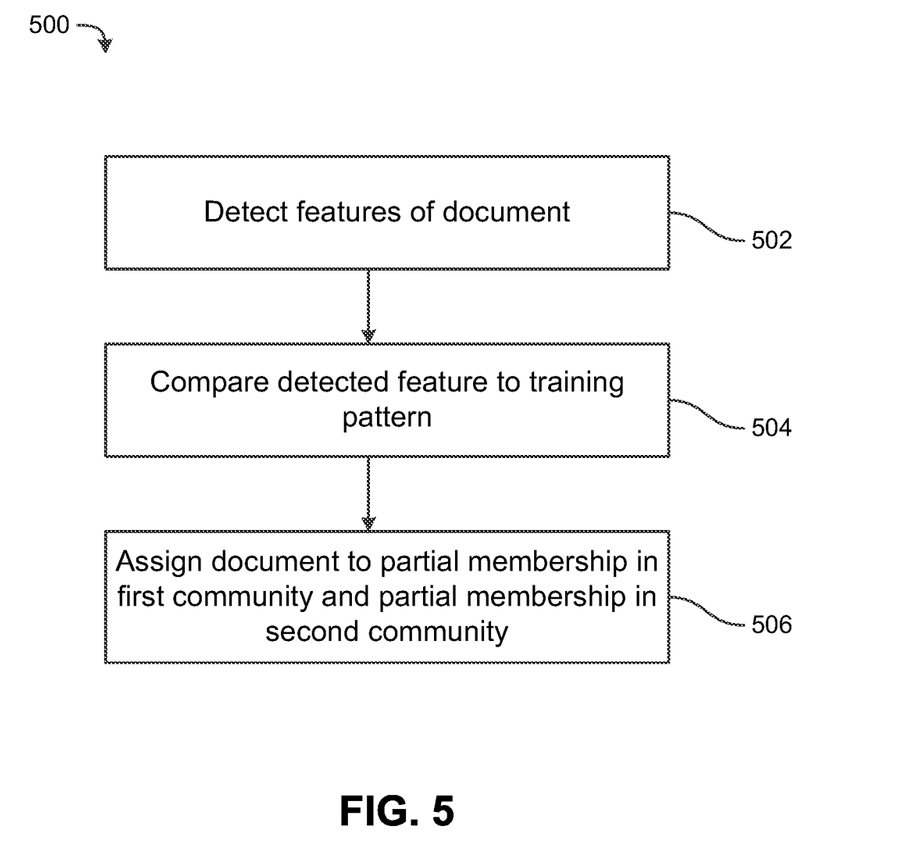
FIG. 5 is a flowchart of an example method for assigning a document to partial membership in communities.
Figure 6:
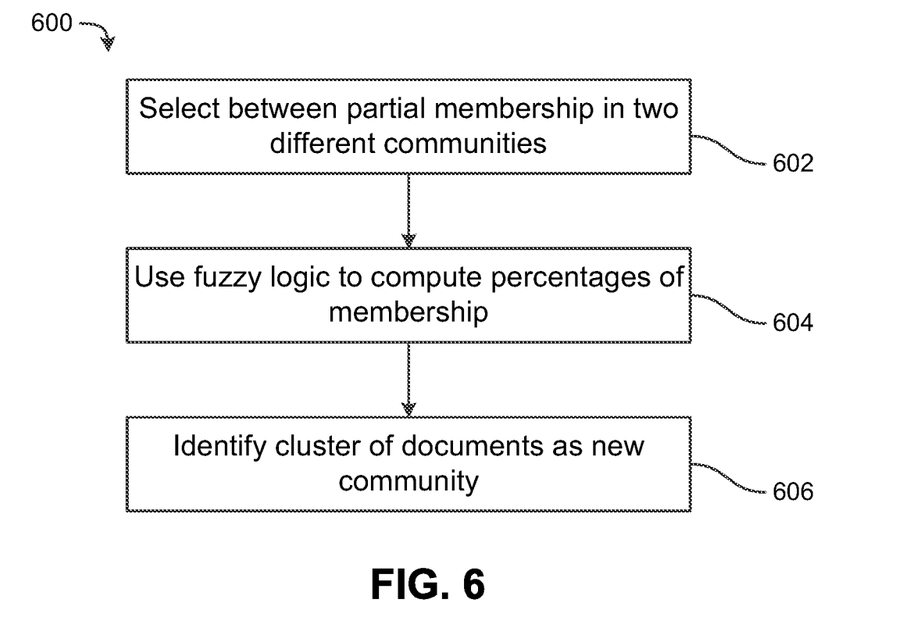
FIG. 6 is a flowchart of an example method for classifying documents.
Figure 7:
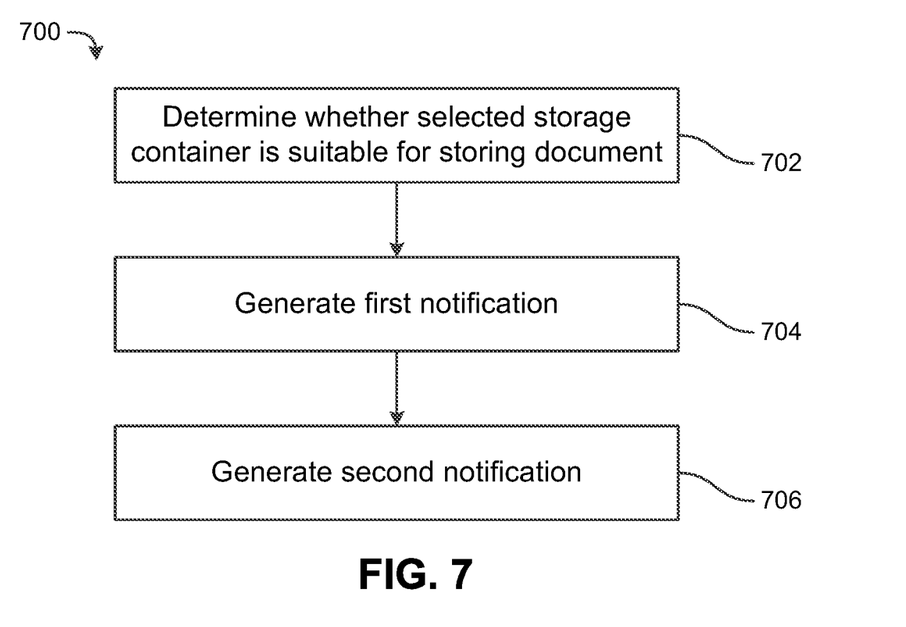
FIG. 7 is a flowchart of an example method for generating notifications regarding document storage.

Methods related to classifying and storing documents discussed with respect to FIGS. 5-7. FIG. 5 is a flowchart of an example method 500 for assigning a document to partial membership in communities. Although execution of method 500 is described below with reference to processor 302 of FIG. 3, it should be understood that execution of method 500 may be performed by other suitable devices, such as processor 402 of FIG. 4. Method 500 may be implemented in the form of executable instructions stored on a machine-readable storage medium and/or in the form of electronic circuitry.

Method 500 may start in block 502, where processor 302 may detect features of a document. Features of a document may include contents of the document and/or metadata associated with the document. For example, processor 302 may detect which day the document was created (e.g., by analyzing metadata of the document), and/or keywords in the document. In some implementations, tf-idf and/or feature extraction and change detection techniques may be used to detect features of the document, as discussed above with respect to FIG. 1.

In block 504, processor 302 may compare a detected feature to a training pattern. The training pattern may be stored, for example, using a data manager module (e.g., data manager module 102 or 202). In some implementations, processor 302 may use the training pattern to recognize confidential information (e.g., the phrase "privileged and confidential") in a document.

In block 506, processor 302 may assign, based on the comparison of the detected feature to the training pattern, the document to partial membership in a first community and partial membership in a second community. In some implementations, processor 302 may use a training pattern to train a neural net, SVM, or BBN to recognize documents associated with the first and/or second community (e.g., by detecting keywords in the documents that are relevant to the first and/or second community), as discussed above with respect to FIG. 1. In some implementations, processor 302 may use a first training pattern to train a neural net/SVM/BBN to recognize documents associated with a first community, and use a second training pattern to train the neural net/SVM/BBN to recognize documents associated with a second community. In implementations where a BBN is used, an explanation may be provided (e.g., by explanation module 214) of why partial memberships were assigned to the first and second communities, as discussed above with respect to FIG. 2.

FIG. 6 is a flowchart of an example method 600 for classifying documents. Although execution of method 600 is described below with reference to processor 402 of FIG. 4, it should be understood that execution of method 600 may be performed by other suitable devices, such as processor 302 of FIG. 3. Some blocks of method 600 may be performed in parallel with and/or after method 500. Method 600 may be implemented in the form of executable instructions stored on a machine-readable storage medium and/or in the form of electronic circuitry.

Method 600 may start in block 602, where processor 402 may select between partial membership of a document in two different communities. For example, a document may include sensitive financial information that should be accessible to either Corporation ABC or Corporation XYZ, but not both. Processor 402 may select which of Corporation ABC and Corporation XYZ to assign partial membership of the document, and may also assign partial membership of the document to a non-corporate (e.g., geographical) community regardless of which corporation is selected. In some implementations, processor 402 may use centroid defuzzification to select between two different communities (e.g., between Corporation ABC and Corporation XYZ). In some implementations, processor 402 may use a keyword-based policy to select between two different communities, as discussed above with respect to FIG. 1. In some implementations, processor 402 may provide an explanation of why Corporation ABC was selected over Corporation XYZ (or vice-versa).

In block 604, processor 402 may use fuzzy logic to compute percentages of membership in a first community and in the second community. For example, certain product-related keywords may be detected in a document, and processor 402 may use fuzzy logic to quantify the relevance (i.e., in terms of percentages) of such keywords to a first product team community and a second product team community. It should be understood that processor 402 may assign partial membership of a document to more than two communities, and that respective percentages of membership may be computed for such additional communities in accordance with the concepts described herein.

In block 606, processor 402 may identify a cluster of documents as a new community. In some implementations, a data manager module (e.g., data manager module 102 or 202) may define a new community, as discussed above with respect to FIG. 1, and processor 402 may identify documents that should be assigned full or partial membership in the new community. In some implementations, processor 402 may define a new community for documents having similar defuzzification scores. A new community may be labeled by a system administrator, or may be automatically labeled by a data manager module.

FIG. 7 is a flowchart of an example method 700 for generating notifications regarding document storage. Although execution of method 700 is described below with reference to processor 402 of FIG. 4, it should be understood that execution of method 700 may be performed by other suitable devices, such as processor 302 of FIG. 3. Some blocks of method 700 may be performed in parallel with and/or after methods 500 and 600. Method 700 may be implemented in the form of executable instructions stored on a machine-readable storage medium and/or in the form of electronic circuitry.

Method 700 may start in block 602, where processor 402 may determine, based on preferred storage container data, whether a selected storage container is suitable for storing a document. For example, processor 402 may retrieve relevant preferred storage container data and determine whether the selected storage container is consistent with the preferred storage container data. In some implementations, preferred storage container data may include criteria for storage containers used to store documents, rather than specifying a particular storage container, as discussed above with respect to FIG. 2, and processor 402 may determine whether a selected storage container meets the criteria. Processor 402 may determine that a selected storage container that does not match a specified storage container in preferred storage container data, or that does not match criteria in preferred storage container data, is not suitable for storing a document.

In block 704, processor 402 may generate a first notification in response to a determination that the selected storage container is not suitable for storing the document. For example, if an employee of Company X selects a public cloud storage service (e.g., storage container 208b) to store a document, processor 402 may generate a pop-up window that may be displayed on the employee's user device (e.g., laptop/workstation), informing the employee that the selected storage service does not conform with the company's storage policies, which may dictate that employees use a private cloud storage service (e.g., storage container 208a) to store company documents. In some implementations, the first notification may include a dialog box informing a user that he/she has selected a storage container that is non-compliant with the relevant preferred storage container data, and asking the user whether he/she wishes to proceed with using the selected (non-compliant) storage container.

In block 706, processor 402 may generate a second notification in response to the document being stored in the selected storage container. For example, if the user confirms that the non-compliant storage container is to be used, processor 402 may generate a second notification (e.g., e-mail or event log entry) that may provide details of the usage of the non-compliant storage container. In some implementations, the second notification may specify the time and date that the non-compliant storage container was used to store a document, and include data that may be used to identify the document that was stored, which non-compliant storage container was used, and the user that selected the non-compliant storage container. In a corporate setting, the second notification may be sent to a supervisor or system administrator at a company. In some implementations, responses to notifications may be used to refine training patterns.

The foregoing disclosure describes assigning documents to partial memberships in various communities and promoting the storage of documents using preferred storage containers. Example implementations described herein enable more relevant results when searching for a desired document and minimization of unauthorized access to documents.

We claim:

1. A system comprising:
a data manager module, comprising computer hardware, configured to store a plurality of training patterns and preferred storage container data;
an analysis module, comprising computer hardware, configured to assign, based on at least one of the plurality of training patterns, a document to partial membership in a first community and partial membership in a second community based on fuzzy logic, wherein:
the first community comprises a first entity type,
the second community comprises a second entity type,
the assignment of the document to the partial membership in the first community and the partial membership in the second community is based on at least one of a keyword or metadata associated with the document, and
the first community and the second community have associated preferred storage container data, including a requirement that the document, based on its assignment to the first community and the second community, be stored using a cloud-based storage service; and
a container module, comprising computer hardware, communicatively coupled to a plurality of storage containers, wherein the container module is configured to transmit the document to one of the plurality of storage containers based on the associated preferred storage container data of the first community and the second community, the storage container being associated with the cloud-based storage service.

2. The system of claim 1, further comprising an authorization module, comprising computer hardware, configured to generate authorization data based on the associated preferred storage container data, wherein the container module is further configured to determine, based on the authorization data, whether a user is authorized to access one of the plurality of storage containers.

3. The system of claim 1, wherein the analysis module is further configured to determine, based on the associated preferred storage container data, whether a selected one of the plurality of storage containers is suitable for storing the document, the system further comprising a notification module, comprising computer hardware, configured to generate a notification in response to a determination that the selected one of the plurality of storage containers is not suitable for storing the document.

4. The system of claim 1, further comprising an explanation module, comprising computer hardware, configured to provide an explanation of the assignment of partial memberships to the first and second communities.

5. The system of claim 1, wherein the analysis module is further configured to:
detect features of the document;
compare detected features with the one of the plurality of training patterns; and
use fuzzy logic to compute percentages of membership in the first community and in the second community.

6. The system of claim 1, wherein the analysis module is further configured to identify a cluster of documents as a new community.

7. The system of claim 1, wherein the analysis module is further configured to select between partial membership of the document in the second community and partial membership of the document in a third community.

8. The system of claim 1, wherein:
the first entity is a company; and
the second entity is a geographical area or location.

9. The system of claim 1, wherein:
the first entity is selected from a group of two or more entities of the same entity type by applying centroid defuzzification.

10. The system of claim 1, wherein:
the first entity is a project group within a company; and
the second entity is a geographical area or location.

11. The system of claim 1, wherein:
the first entity is a company; and
the second entity is a person or project group.

12. The system of claim 1, wherein:
the first community is selected from a group of two or more communities of a first entity type by applying centroid defuzzification; and
the second community is selected as the community with the highest fuzziness score that is of a second entity type.

13. A non-transitory machine-readable storage medium encoded with instructions executable by a processor, the machine-readable storage medium comprising:
- instructions to detect features of a document;
- instructions to compare a detected feature with a training pattern;
- instructions to identify, based on the comparison of the detected feature with the training pattern, a first community and a second community to which the document is to be assigned partial membership based on fuzzy logic, wherein:
  - the first community comprises a first entity type,
  - the second community comprises a second entity type,
  - the assignment of the document to the partial membership in the first community and the partial membership in the second community is based on at least one of a keyword or metadata associated with the document, and
  - the first community and the second community have associated preferred storage container data, including a requirement that the document, based on its assignment to the first community and the second community, be stored using a cloud-based storage service;
- instructions to use fuzzy logic to compute percentages of membership in the first community and in the second community; and
- instructions to transmit the document to a storage container based on the associated preferred storage container data of the first community and the second community, the storage container being associated with the cloud-based storage service.

14. The non-transitory machine-readable storage medium of claim 13, further comprising instructions to identify a cluster of documents as a new community.

15. The non-transitory machine-readable storage medium of claim 13, further comprising:
- instructions to select between the second community and a third community when identifying communities to which the document is to be assigned partial membership; and
- instructions to provide an explanation of the selection of the second or third community.

16. The non-transitory machine-readable storage medium of claim 13, further comprising instructions to identify, based on authentication credentials, one of the first community and the second community.

17. A method comprising:
- detecting, using a processor, features of a document;
- comparing, using the processor, a detected feature to a training pattern;
- assigning, using the processor, based on the comparison of the detected feature to the training pattern, the document to partial membership in a first community and partial membership in a second community based on fuzzy logic, wherein:
  - the first community comprises a first entity type,
  - the second community comprises a second entity type,
  - the assignment of the document to the partial membership in the first community and the partial membership in the second community is based on at least one of a keyword or metadata associated with the document, and
  - the first community and the second community have associated preferred storage container data, including a requirement that the document, based on its assignment to the first community and the second community, be stored using a cloud-based storage service; and
- transmitting, using the processor, the document to a storage container based on the associated preferred storage container data of the first community and the second community, the selected storage container being associated with the cloud-based storage service.

18. The method of claim 17, further comprising:
- selecting between partial membership of the document in the second community and partial membership of the document in a third community; and
- using fuzzy logic to compute percentages of membership in the first community and in the second community.

19. The method of claim 17, further comprising identifying a cluster of documents as a new community.

20. The method of claim 17, further comprising:
- determining, based on the associated preferred storage container data, whether a selected storage container is suitable for storing the document;
- generating a first notification in response to a determination that the selected storage container is not suitable for storing the document; and
- generating a second notification in response to the document being stored in the selected storage container.

* * * * *